(12) United States Patent
Mankame et al.

(10) Patent No.: US 12,115,891 B2
(45) Date of Patent: Oct. 15, 2024

(54) CUSHION MEMBER HAVING VARIABLE STIFFNESS

(71) Applicant: GM Global Technology Operations LLC, Detroit, MI (US)

(72) Inventors: Nilesh D. Mankame, Ann Arbor, MI (US); Wonhee M. Kim, Royal Oak, MI (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 18/058,501

(22) Filed: Nov. 23, 2022

(65) Prior Publication Data
US 2024/0166107 A1   May 23, 2024

(51) Int. Cl.
*B60N 2/72* (2006.01)

(52) U.S. Cl.
CPC .................................... *B60N 2/72* (2013.01)

(58) Field of Classification Search
CPC ......................................................... B60N 2/72
See application file for complete search history.

*Primary Examiner* — Mathew Franklin Gordon
(74) *Attorney, Agent, or Firm* — Vivacqua Crane, PLLC

(57) ABSTRACT

A cushion member having improved variable stiffness for a target is provided. The cushion member comprises a cushion housing having an interior with a variable internal pressure and an exterior surface for receiving the target. The cushion housing is arranged to be deformable and comprises granular particles disposed in the interior of the cushion housing. The cushion housing further comprises hollow particles disposed therein with the granular particles. Each hollow particle is compressible and hollow to define a void therein. The hollow particles have a size, a wall thickness, a material, and a bulk modulus defining infill properties thereof. The hollow particles and the granular particles are arranged to allow the cushion housing to be deformed upon contact with the target. The hollow particles and granular particles define a cushion infill having a variable stiffness based on the infill properties and the variable internal pressure of the interior.

20 Claims, 4 Drawing Sheets

CUSHION MEMBER HAVING VARIABLE STIFFNESS

INTRODUCTION

The present disclosure relates to cushion members with variable stiffness and, more particularly, cushion members having improved variable stiffness for an occupant of a vehicle.

Many current seat surfaces or "A-surfaces" of a vehicular seat cushion contour an occupant for a limited duration. Although comfort is an important factor in vehicular seat technology, there are many challenges. After prolonged seating, comfort experience by the occupant may be reduced. Once contoured to an occupant, the seat may lock the occupant in a fixed position, preventing adjustments or movements that affect long term comfort.

SUMMARY

Thus, while current seat cushions achieve their intended purpose, there is a need for a new and improved system and method for varying stiffness of a cushion member for an occupant of a vehicle.

In accordance with one aspect of the present disclosure, a cushion member having improved variable stiffness for a target is provided. The cushion member comprises a cushion housing having an interior with a variable internal pressure. The cushion housing has an exterior surface for receiving the target. The cushion housing is arranged to be deformable and sealable. The cushion housing comprises granular particles disposed in the interior of the cushion housing and hollow particles disposed with the granular particles therein. Each hollow particle is compressible and hollow to define a void therein. The hollow particles have a size, a wall thickness, a material, and a bulk modulus defining infill properties thereof. The hollow particles and the granular particles are arranged to allow the cushion housing to be deformed upon contact with the target. The hollow particles and granular particles define a cushion infill having a variable stiffness based on the properties of the hollow particles, the infill for the hollow particles, the granular particles and the variable internal pressure of the interior of the cushion housing.

In one embodiment, the variable stiffness of the cushion infill varies between about 0.5 kilopascal (kPa) to about 3 kPa, about 10 kPa to about 15 kPa, and about 5 to about 8 kPa. In another embodiment, the hollow particles have an outer diameter of between about 5 millimeter (mm) and about 25 mm. In yet another embodiment, each hollow particle comprises a through-hole formed therethrough such that the void is in fluid communication with the interior.

In one embodiment, each hollow particle has a compressible component disposed in the void thereof to affect the bulk modulus of the hollow particle. In still another embodiment, each hollow particle comprises an outer wall having an inner surface. The inner surface has inner structures extending inward therefrom whose interaction can affect the bulk modulus of the hollow particle. In another embodiment, the cushion member is one of a seat cushion of a vehicular seat and a receiving member for a mechanical loading mechanism. Moreover, the target is one of an occupant of a vehicle and a workpiece.

In accordance with another aspect of the present disclosure, a method of varying stiffness of a cushion member for an occupant of a vehicle is provided. The method comprises providing a cushion housing having an interior with a variable internal pressure, the cushion housing having an exterior surface for receiving the occupant. The cushion housing is arranged to be deformable and sealable. The cushion housing comprises granular particles disposed in the interior of the cushion housing and hollow particles disposed with the granular particles therein. Each hollow particle is compressible and hollow to define a void therein. The hollow particles have a size, a wall thickness, a material, and a bulk modulus defining infill properties thereof. The hollow particles and the granular particles are arranged to allow the cushion housing to be deformed upon contact with the occupant. The hollow particles and granular particles define a cushion infill having a variable stiffness based on the infill properties of the hollow particles and the variable internal pressure of the interior of the cushion housing.

The method further comprises fluidizing the cushion infill with positive pressure to the interior such that the hollow particles and granular particles can relatively move past one another within the interior defining a soft stiffness state at a first pressure.

The method further comprises deforming the cushion housing in the soft state in response to contact with the occupant on the exterior surface.

The method further comprises decreasing the internal pressure of the interior from the first pressure to a second pressure in response to continual contact with the occupant such that the hollow particles are compressed due to frictional contact and interlocked with the granular particles due to mechanical interference and friction, allowing the cushion housing to form a first conformal shape of the occupant on the exterior surface, and to define a semi-rigid stiffness state at the second pressure.

The method further comprises changing the internal pressure from the second pressure to a third pressure such that the hollow particles decompress, allowing the cushion housing to conform consistent with the occupant movement defining an intermediate stiffness state at the third pressure.

The method further comprises lowering the internal pressure from the intermediate state to the semi-rigid state at the second pressure in response to continued contact with the occupant such that the hollow particles are re-compressed, thereby allowing the cushion housing to re-attain the semi-rigid stiffness state.

The stiffness of the cushion is, expressed in a similar term as that of a block of foam, a stress experienced by a sample subjected to uniform uniaxial compressive strain at a pre-specified strain (e.g. 40% of the cushion). In one example, the first pressure (soft state) is between about 0.5 kPa and about 3 kPa, the second pressure (semi-rigid state) is between about 10 kPa and about 15 kPa, and the third pressure (intermediate state) is between about 5 kPa and about 8 kPa. In another example, the variable stiffness of the cushion infill varies between about 0.01 kPa to about 0.1 kPa, about 0.1 kPa to about 3 kPa, and about 0.5 kPa to about 15 kPa.

In another example, the step of deforming the cushion housing comprises venting the cushion housing in response to contact with the occupant at a rate of between about 0.001%/s and about 20%/s relative to pressure. In yet another example, the exterior surface defines a upper side for receiving the occupant. The cushion housing comprises side walls extending from the first side to define the interior. At least one of the side walls is arranged to deform in response to contact with the occupant.

In one example, the step of changing the internal pressure of the interior is in response to trajectory inputs relative to at least one of vehicle speed, vehicle terrain, road conditions, road type, and selected driving mode. In another example, each hollow particle comprises a through-hole formed therethrough such that the void is in fluid communication with the interior. In yet another example, each hollow particle has a compressible component disposed in the void thereof to affect the bulk modulus of the hollow particle.

In accordance with yet another aspect of the present disclosure, a system for varying stiffness of a cushion member for an occupant of a vehicle is provided. The system comprises a cushion housing having an interior with a variable internal pressure. The cushion housing has an exterior surface for receiving the occupant. The cushion housing is arranged to be deformable and sealable. The cushion housing comprises granular particles, fibrous media and hollow particles disposed in the interior of the cushion housing. Each hollow particle is compressible and hollow to define a void therein. The hollow particles have a size, a wall thickness, a material, and a bulk modulus defining infill properties thereof. The hollow particles and the granular particles are arranged to allow the cushion housing to be deformed upon contact with the occupant. The hollow particles, fibrous media and granular particles define a cushion infill having a variable stiffness based on the properties of the hollow particles, the infill material for the hollow particles, the granular particles, the fibrous media and the variable internal pressure of the interior of the cushion housing.

The system further comprises an air pump in fluid communication with the cushion housing. The air pump arranged to pressurize the cushion infill with positive pressure such that the hollow particles, fibrous media and granular particles can easily move past one another within the interior defining a soft stiffness state at a first pressure. Moreover, the cushion housing is arranged to deform or conform in the soft state in response to contact with the occupant on the exterior surface.

The system further comprises a vacuum pump in fluid communication with the cushion housing, the vacuum pump arranged to decrease the internal pressure of the interior from the first pressure to a second pressure such that the hollow particles are compressed and interlocked due to mechanical interferences with other particles and the enclosure, and the granular particles and fibrous media are also interlocked with the hollow particles and each other due to mechanical interference and friction, allowing the cushion housing to form a first conformal shape of the occupant on the exterior surface to define a semi-rigid stiffness state at the second pressure.

The system further comprises at least one sensor in communication with the interior of the cushion housing. The at least one sensor arranged to measure cushion housing variables.

The system further comprises a controller in communication with the air pump, the vacuum pump, the at least one sensor, an optional controllable valve that modulates the fluid communication between the interior of the housing and the environment. The controller is arranged to receive cushion housing variable inputs from the sensor and to control the air pump, the vacuum pump, and the at least one sensor. The system further comprises a power source arranged to power the air pump, the vacuum pump, the at least on sensor, and the controller.

In this aspect, the air pump or the valve is arranged to increase the internal pressure from the second pressure to a third pressure to enable the cushion to attain an intermediate stiffness state at the third pressure.

Further to this aspect, the vacuum pump is arranged to lower the internal pressure from the intermediate stiffness state to the semi-rigid stiffness state at the second pressure.

In one embodiment, the at least one sensor is at least one of a pressure sensor, a motion sensor, and a weight sensor. In another embodiment, the first pressure begins at atmospheric pressure, with the cushion unloaded, but possibly rising to +5 kPa pressure as the cushion is loaded and its volume compressed. The second pressure range is negative, removing air to constrict cushion volume around infill media, where pressures can range from atmospheric to a negative pressure up to, but not greatly exceeding the onset of compressing the infill media at an intermediate state (−5 kPa±10%). Drawing additional vacuum pressure will help trigger a final infill transition and induce tighter interlock between the particles; vacuum pressures in such state is a semi-rigid media initial stiffness (−10 kPa±10%), but may be increased to −50 kPA to further rigidify the cushion. In yet another embodiment, the variable stiffness of the cushion infill varies between about 0.5 kilopascal (kPa) to about 3 kPa, about 10 kPa to about 15 kPa, and about 5 to about 8 kPa.

In still another embodiment, the system further comprises a transceiver in communication with the controller. The transceiver is arranged to transmit trajectory inputs to the controller for changing the internal pressure of the interior of the cushion. The trajectory inputs are relative to at least one of vehicle speed, vehicle terrain, road conditions, road type, and selected driving mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments and examples of the present disclosure provide systems and methods of varying stiffness of a cushion member for an occupant of a vehicle. The systems and methods provide granular particles and hollow particles disposed in a cushion housing to define a cushion infill. Depending on occupant movement along with pressure in the cushion housing and trajectory inputs (e.g., road conditions, terrain, and road type), the cushion infill is able to re-shape and conform to occupant movements during prolonged seating. The embodiments and examples provided allow for the cushion member to conform to occupant movement between a number of stiffness states including a soft state, a semi-rigid state, and an intermediate state based on occupant movement and trajectory inputs. As a result, the occupant experiences enhanced comfort during prolonged seating.

Figures 1A, 1B:
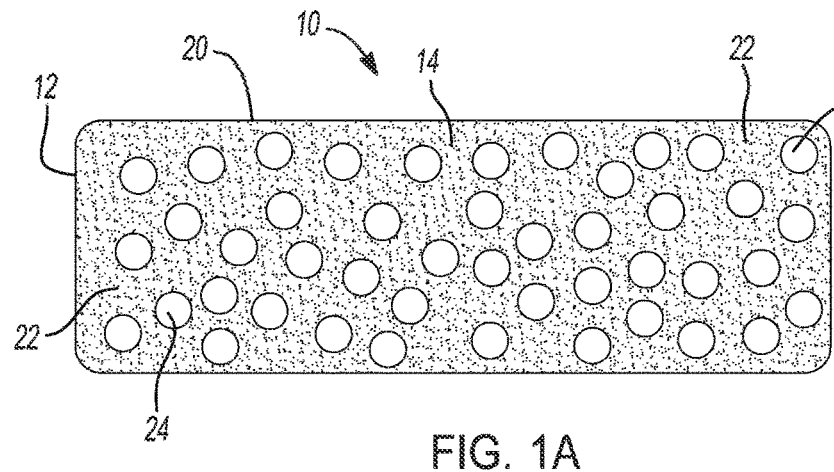
FIG. 1A is a cross-sectional view of a cushion member having hollow particles for improved variable stiffness in accordance with one embodiment of the present disclosure.
FIG. 1B is a cross-sectional view of one of the hollow particles in FIG. 1A.

FIG. 1A illustrates a cushion member 10 having improved variable stiffness for a target in accordance with one embodiment of the present disclosure. As shown, the cushion member 10 comprises a cushion housing 12 having an interior 14 with a variable internal pressure. The cushion housing 12 has an exterior surface 20 (e.g., an A-surface of a seat cushion) for receiving the target. The cushion housing 12 is arranged to be deformable and sealable. As depicted in FIG. 1A, the cushion housing 12 comprises granular particles 22, fibrous media, disposed in the interior 14 of the cushion housing 12 and hollow particles 24 disposed with the granular particles 22 and fibrous media therein.

Referring to FIGS. 1A-1B, each hollow particle 24 has an outer wall 26 that is deformable and defines a void 28 therein. Moreover, the hollow particles 24 each have a size, a wall thickness, a material, and infill with prescribed mechanical properties (e.g. bulk modulus) thereof. As discussed in greater detail below, the hollow particles 24 and the granular particles 22 are arranged to allow the cushion housing 12 to be deformed upon contact with the target. The hollow particles 24, granular particles 22, and fibrous media define a cushion infill having a variable stiffness based on the properties of the hollow particles 24, the cushion housing 12 and the variable internal pressure of the interior 14 of the cushion housing 12.

In one embodiment, the variable stiffness of the cushion infill varies between about 0.5 kilopascal (kPa) to about 3 kPa, about 10 kPa to about 15 kPa, and about 5 to about 8 kPa. Other ranges may be used to define the variable stiffness without departing from the spirit or scope of the present disclosure.

In one example, each hollow particle may have an outer diameter size of between about 5 millimeter (mm) and about 25 mm. Other ranges of size may be used without departing from the spirit or scope of the present disclosure. The outer wall may have a wall thickness of between about 0.1 mm and about 3 mm. Other ranges of wall thickness may be used without departing from the spirit or scope of the present disclosure. Additionally, each hollow particle may have a bulk modulus of between about 0.1 kPa and about 15 kPa. Other ranges of bulk modulus may be used without departing from the spirit or scope of the present invention.

Further, the hollow particles may be comprised of plastic, polymers, elastomers, thermoplastics, thermosets, polyolefins, polyethylene, polypropylene, polystyrene, polyvinyl chloride, polyvinylidene chloride, polyvinyl acetate, acrylic polymers, polyacrylonitrile, polymethyl methacrylate, or any other suitable materials without departing from the spirit or scope of the present disclosure.

It is to be understood that each hollow particle may contain a compressible component disposed in the void thereof to affect the bulk modulus of the hollow particle. Such compressible component may be any suitable material that is compressible such as a gas, gel, or liquid. For example, the compressible component may be coir from the husk of a coconut, polymeric foam, or any other suitable compressible component without departing from the spirit or scope of the present disclosure.

Figure 2:
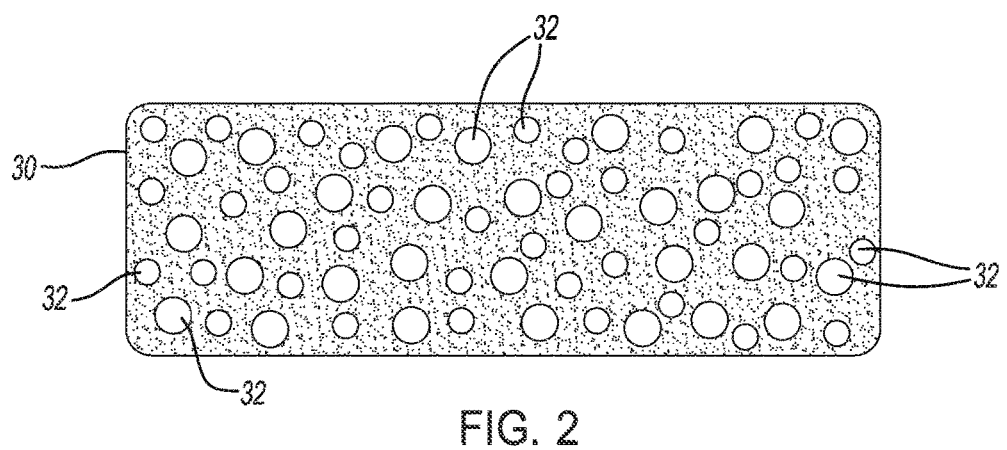
FIG. 2 is a cross-sectional view of a cushion member having hollow particles for improved variable stiffness in accordance with another embodiment.

As shown in FIGS. 1A-1B, the hollow particles 24 may have a spherical shape. However, it is to be understood that the hollow particles may take on any suitable shape without departing from the spirit or scope of the present disclosure. Referring the FIG. 2, a cushion housing 30 contains hollow particles 32 having a plurality of different sizes. For example, the hollow particles 32 may differ in outer diameter, wall thickness, and material as desired without departing from the spirit or scope of the present disclosure.

Figures 3A, 3B:
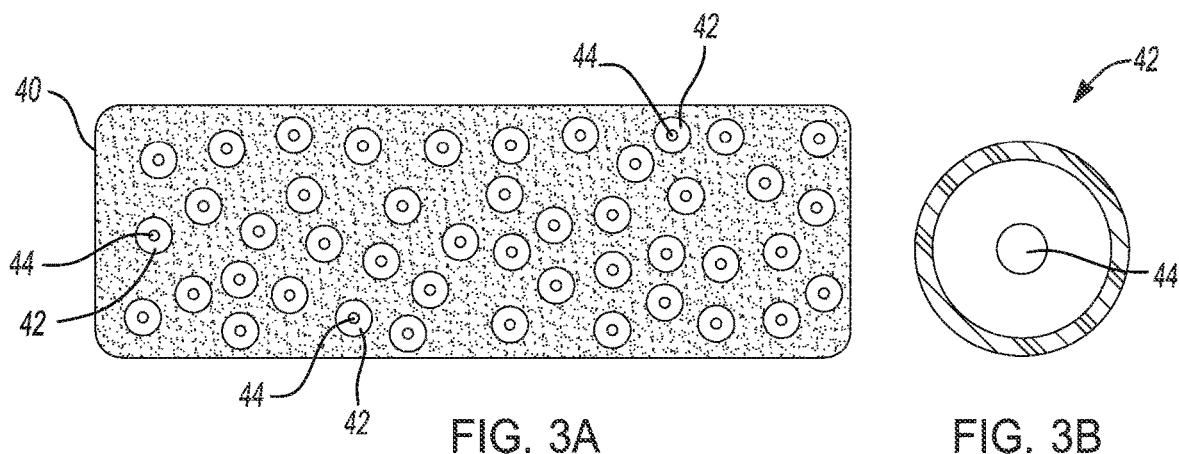
FIG. 3A is a cross-sectional view of a cushion member having hollow particles for improved stiffness in accordance with yet another embodiment.
FIG. 3B is a cross-sectional view of one of the hollow particles in FIG. 3A.

Referring to FIGS. 3A-3B, a cushion housing 40 comprises hollow particles 42 wherein each hollow particle 42 may comprise a hole 44 formed therethrough such that a void 48 is in fluid communication with the interior. The hole 44 allows for enhanced compressibility of the hollow particle. As shown in FIG. 3B, the hollow particle comprises one hole 44 formed therethrough. However, it is to be understood that a plurality of holes may be formed through each hollow particle without departing from the spirit or scope of the present invention.

Figure 4:
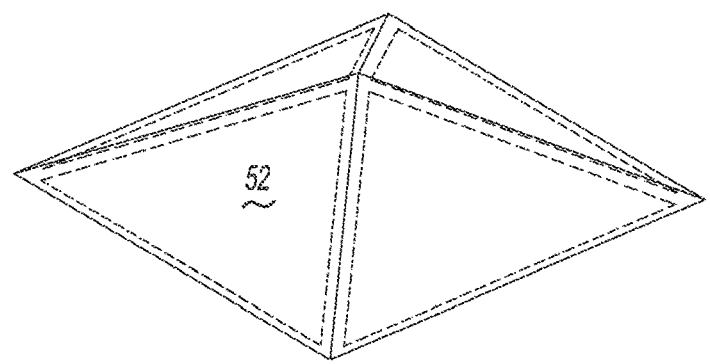
FIG. 4 is a perspective view of a hollow particle in accordance with another embodiment of the present disclosure.
Figure 5:
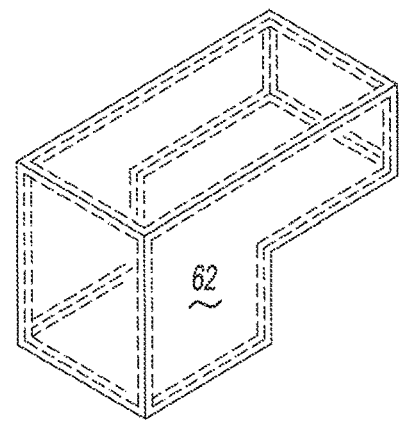
FIG. 5 is a perspective view of a hollow particle in accordance with still another embodiment.

FIG. 4 depicts a pyramid shaped hollow particle 52 and FIG. 5 illustrates a block shaped hollow particle 62. As with the hollow particles provided above, each of the hollow particles 52, 62 allow the cushion infill to be compressed to a desired variable stiffness based on the infill properties of the respective hollow particles and the variable internal pressure of the interior of the cushion housing.

Figure 6:
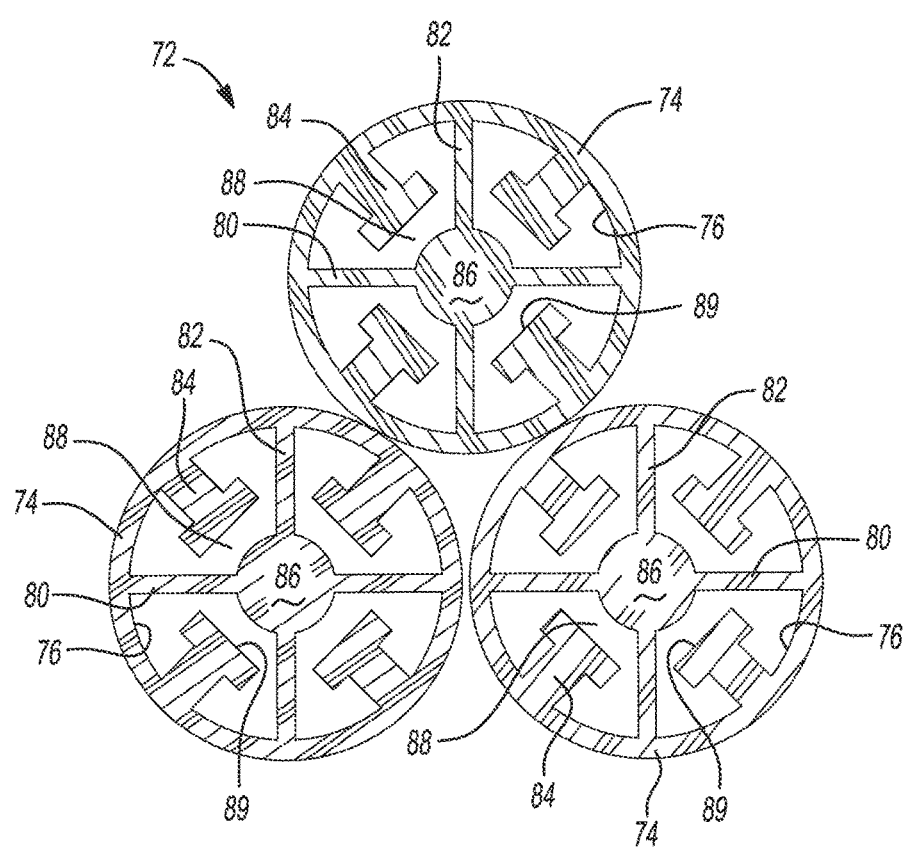
FIG. 6 is a cross-sectional view of hollow particles in accordance with another embodiment.

Referring to FIG. 6, the cushion housing may comprise hollow particles 72 in accordance with another embodiment. As shown, each hollow particle 72 comprises an outer wall 74 having an inner surface 76. The inner surface 76 has an inner structure 80 extending radially inward therefrom to affect the bulk modulus of the hollow particle 72. The inner structure 80 may take on any suitable shape to affect the bulk modulus of the hollow particle 72. In the example shown in FIG. 6, the inner structure 80 comprises alternating baffles 82 and columns 84 extending from the inner surface 76. As shown, each baffle 82 extends to a central core 86 to which the columns 84 nearly abut thereby defining a space 88 between the core 86 and each column end 89. In this embodiment, as the variable internal pressure decreases and contact with the target continues, the hollow particle 72 compresses such that the columns 84 and baffles 82 are in contact and the column ends 89 abut the central core 86.

Preferably, the cushion member is a seat cushion of a seat of a vehicle and the target is an occupant of the vehicle. However, it is to be understood that the cushion member may be a receiving member of a mechanical loading mechanism wherein the target is a mechanical workpiece.

Figure 7:
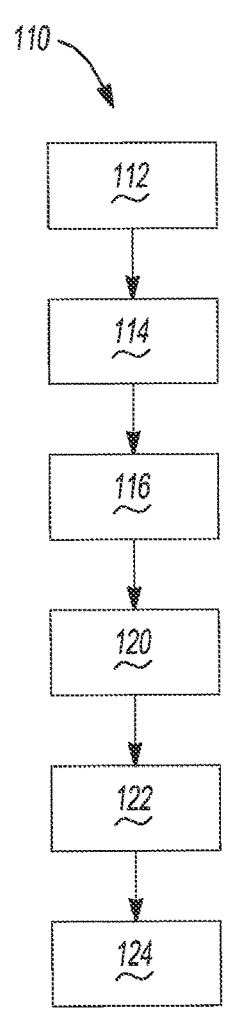
FIG. 7 is a flowchart for a method of varying stiffness of the cushion member in FIG. 1A for an occupant of a vehicle in accordance with one example of the present disclosure.

FIG. 7 illustrates a flowchart for a method 110 of varying stiffness of the cushion member 10 in FIG. 1A for an occupant of a vehicle in accordance with one example of the present disclosure. As shown in block 112, the method 110 comprises providing a cushion housing 12 (FIG. 1A) having an interior 14 with a variable internal pressure. The cushion housing 12 has an exterior surface 20 for receiving the occupant. For example, the exterior surface 20 may be the A-surface of a vehicular seat cushion.

As previously discussed, the cushion housing 12 is arranged to be deformable and sealable. Moreover, the cushion housing 12 comprises granular particles 22, and fibrous media disposed in the interior 14 of the cushion housing 12 and hollow particles 24 disposed with the granular particles 22 therein. As shown, each hollow particle 24 has an outer wall 26 that is deformable and is formed to define a void 28 therein. Additionally, the hollow particles 24 have a size, a wall thickness, a material, and an infill with a specified bulk modulus.

In this example, the hollow particles 24 and the granular particles 22 are arranged to allow the cushion housing 12 to be deformed upon contact with the occupant. As mentioned, the hollow particles 24 and granular particles 22 define a cushion having a variable stiffness based on the properties of the hollow particles 24, the cushion housing 12, the granular particles 22 and fibrous media and the variable internal pressure of the interior 14 of the cushion housing 12.

Figure 8A:
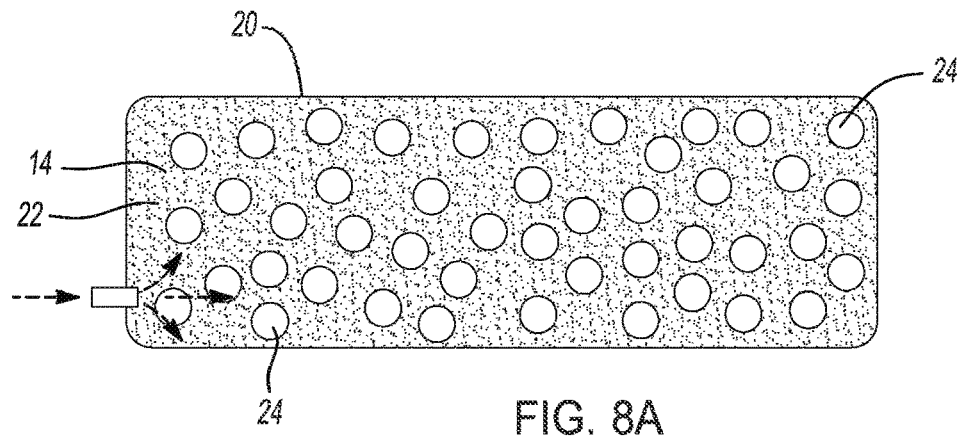
FIG. 8A is a cross-sectional view of a cushion member in a soft stiffness state in accordance with the embodiment in FIG. 1A.

In block 114, the method 110 further comprises fluidizing the cushion infill by applying positive pressure to the interior 14 such that the hollow particles 24 and granular particles 22 and fibrous media can readily move past one another within the interior 14 defining a soft stiffness state at a first pressure. That is, in the soft stiffness state, the hollow particles 24 and granular particles 22 and fibrous media are fluidized or relatively free to be moved/circulated within the interior 14 as illustrated in FIG. 8A. Fluidizing the cushion infill may be accomplished with an air pump (discussed below) in fluid communication with the cushion housing 12.

Figure 8B:
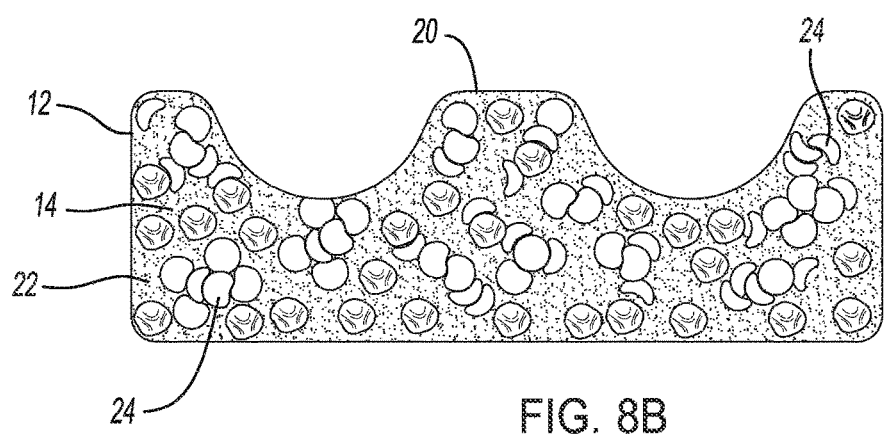
FIG. 8B is a cross-sectional view of a cushion member in a semi-rigid state in accordance with the embodiment of FIG. 8A.

In block 116, the method 110 further comprises deforming the cushion housing 12 in the soft state in response to contact with the occupant on the exterior surface 20. That is, when the occupant rests or makes contact with the exterior surface 20, the cushion housing 12 is arranged to deform consistent with movements and weight displacements of the occupant. Additionally, during the step of deforming the cushion housing 12, the interior 14 of the cushion housing 12 may be vented through a controllable valve in communication with the cushion housing 12 in response to contact with the occupant. The venting or pressure release may be done at a rate of between about 1%/s and about 25%/s relative to one of pressure and volume. In block 120, the method 110 further comprises decreasing the internal pressure of the interior 14 from the first pressure to a second pressure. Decreasing the internal pressure of the interior 14 may be accomplished with a vacuum pump (discussed below) in fluid communication with the cushion housing 12. Lowering or decreasing the internal pressure is accomplished such that the hollow particles 24 are interlocked with one another, the granular particles 22 and/or the fibrous media due to mechanical interference and/or frictional contact as depicted in FIG. 8B. Such compression of the hollow particles 24 allow the cushion housing 12 to form a first conformal shape of the occupant on the exterior surface 20 to define a semi-rigid stiffness state at the second pressure (FIG. 8B).

Figure 8C:
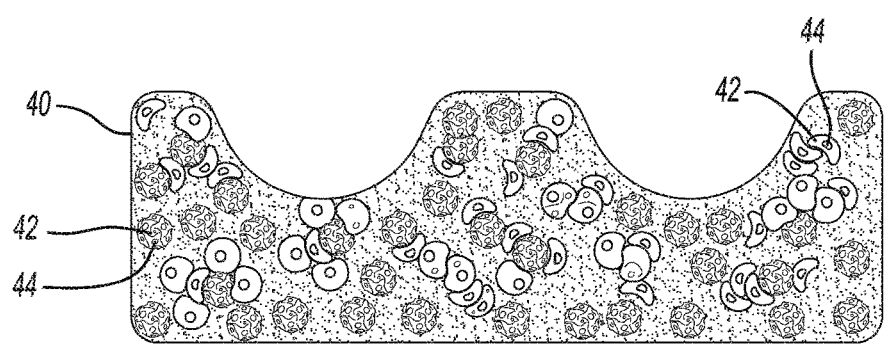
FIG. 8C is a cross-sectional view of a cushion member in a semi-rigid state in accordance with another embodiment.

As in FIG. 8B, FIG. 8C illustrates the cushion housing 40 in the semi-rigid stiffness state. In this example, the cushion housing 40 has hollow particles 42 with holes 44 (FIGS. 3A-3B) formed therethrough or with permeable walls.

Figure 8D:
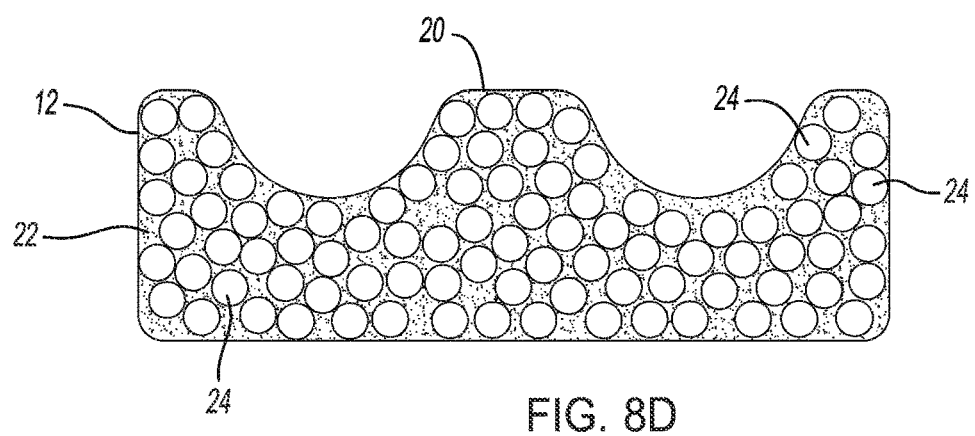
FIG. 8D is a cross-sectional view of a cushion member in an intermediate state in accordance with the embodiment of FIG. 8B.

In block 122, the method 110 further comprises changing the internal pressure from the second pressure to a third pressure. In this example, changing or increasing the internal pressure is done with the air pump or controllable valve thereby lessening frictional contact and mechanical interference between the hollow particles 24, granular particles 22 and fibrous media such that the hollow particles 24 decompress. Decompression of the hollow particles 24 allows the cushion to attain an intermediate stiffness state at the third pressure as shown in FIG. 8D.

Alternatively, changing the internal pressure of the interior 14 may additionally be in response to trajectory inputs relative to at least one of vehicle speed, vehicle terrain, road conditions, road type, and selected driving mode. As will be further described below, pressure changes between the second and third pressures (i.e., between the semi-rigid and intermediate states) may occur a plurality of times during a vehicle drive based on the trajectory inputs and occupant movements/weight displacements.

As shown by FIG. 7 in block 124, the method 110 further comprises lowering the internal pressure with the vacuum pump from the intermediate state (FIG. 8D) to the semi-rigid state (FIG. 8B) at the second pressure. In this example, the lowering or decreasing the internal pressure is done such that the hollow particles 24 are compressed and interlocked with the granular particles 22 and fibrous media due to mechanical interference and friction. Moreover, in this example, the third pressure is lower than the first pressure and the second pressure is higher than the third pressure.

In one example, the first internal cushion pressure (soft stiffness state) is about 0 or atmospheric but may increase positively as the cushion is loaded, the second internal pressure (semi-rigid stiffness state) is between about −10 kPa and about −12 kPa so the infill is not completely collapsed, but could be raised to as much as −50 kPa to completely stiffen the cushion; and the third pressure (intermediate stiffness state) is between about −3 kPa and about −5 kPa, enough to constrain the media to be in close communication to adjacent neighbors, but not collapse the infill media. For each of the first pressure, the second pressure, and the third pressure, any other suitable ranges may be used without departing from the spirit or scope of the present disclosure.

Figure 9:
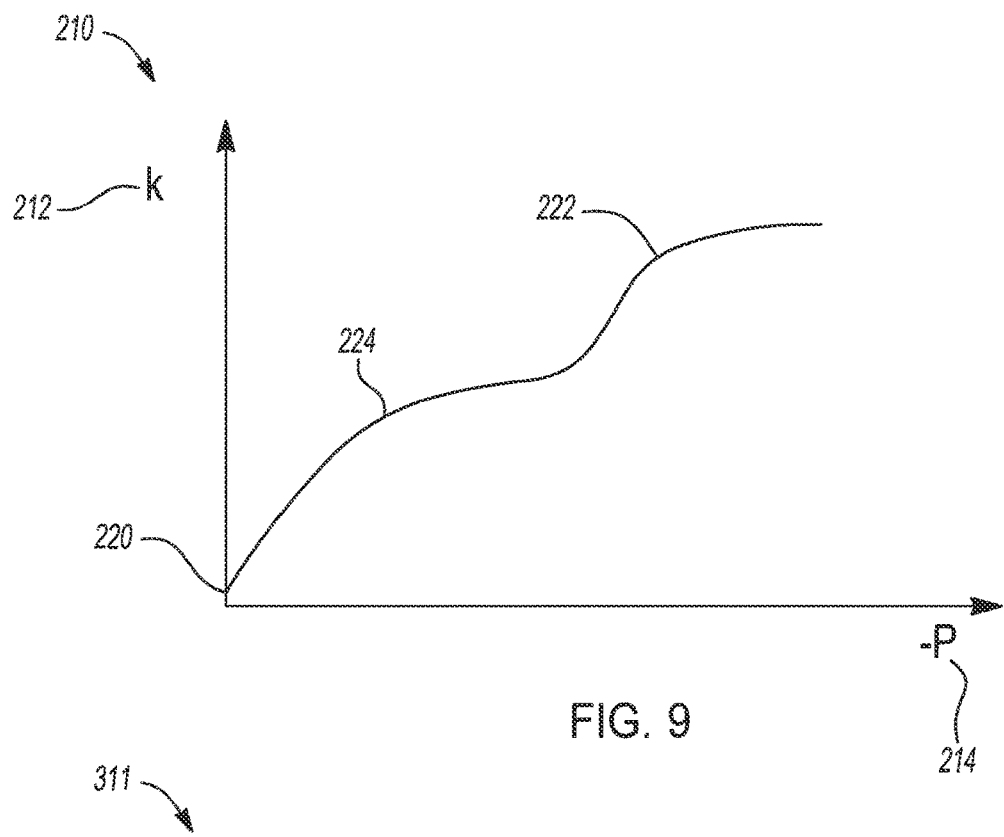
FIG. 9 is a graph of stiffness vs. pressure for the cushion member in FIG. 1A in accordance with one example.

In accordance with one example, FIG. 9 illustrates a graph 210 of the relationship between cushion stiffness 212 on a y-axis and pressure 214 of the cushion interior 14 on an x-axis. As shown, the soft stiffness state 220 is defined at the first pressure and at relatively low stiffness, the semi-rigid stiffness state 222 is defined at the second pressure and semi-rigid stiffness, and the intermediate state 224 is defined at the third pressure and intermediate stiffness.

In one example, the variable stiffness of the cushion infill varies between about 0.5 kilopascal (kPa) to about 3 kPa, about 10 kPa to about 15 kPa, and about 5 to about 8 kPa. Other ranges may be used to define the variable stiffness without departing from the spirit or scope of the present disclosure.

In another example, the exterior surface may be of an upper side for receiving the occupant. As such, the cushion housing may comprise side walls extending from the upper side and integrally connecting to define the interior 14. In this example, at least one of the side walls may be arranged to deform in response to contact with the occupant.

Figure 10:
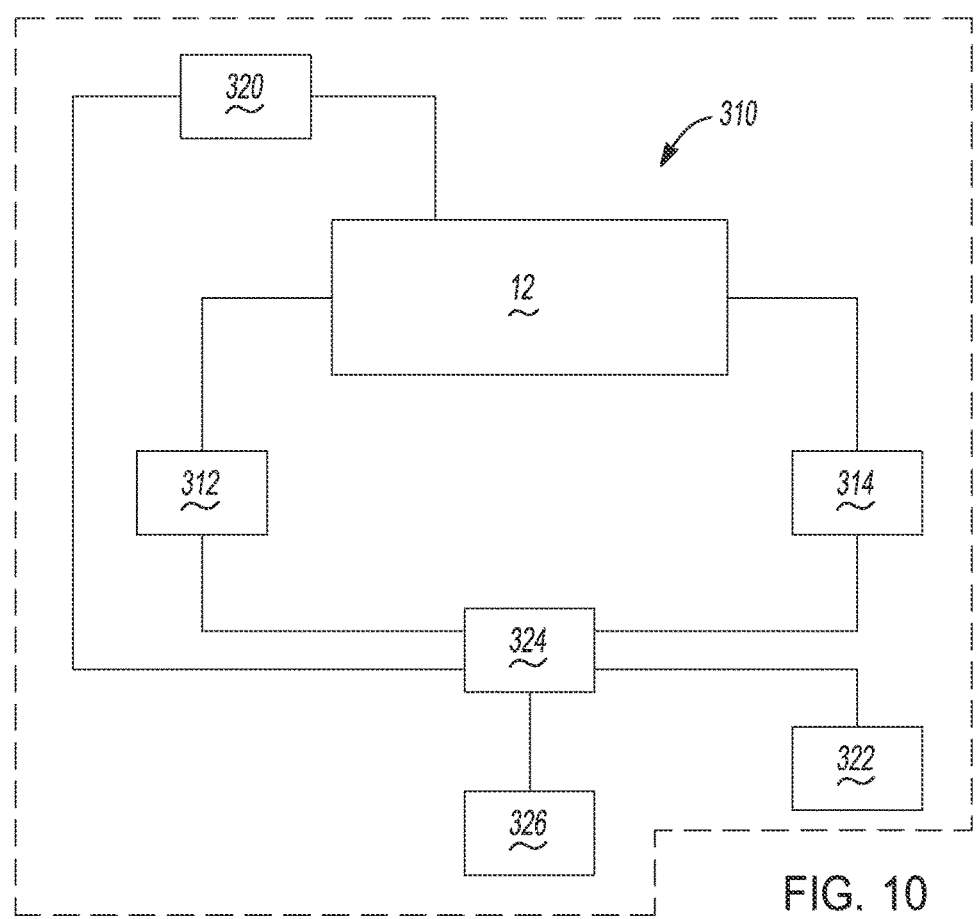
FIG. 10 is a schematic diagram of a system for varying stiffness of the cushion member in FIG. 1A for an occupant of a vehicle in accordance with one example of the present disclosure.

FIG. 10 illustrates a schematic diagram of a system 310 for varying stiffness of a cushion member 10 (FIG. 1A) for an occupant of a vehicle 311 in accordance with one embodiment of the present disclosure. In this embodiment, the system 310 implements the method 110 of FIG. 7 of varying stiffness of the cushion for an occupant of the vehicle 311. As depicted in FIG. 10, the system 310 comprises the cushion housing 12, an air pump 312, a vacuum pump 314, at least one sensor 320, a transceiver 322, a controller 324, and a power source 326.

Referring to FIGS. 1A and 10, the system 310 comprises the cushion housing 12 having an interior 14 with a variable internal pressure. Moreover, the cushion housing 12 has an exterior surface 20 for receiving the occupant. Further, the cushion housing 12 is arranged to be deformable and sealable.

As previously discussed, the cushion housing 12 comprises granular particles 22 and fibrous media disposed in the interior 14 of the cushion housing 12 and hollow particles 24 disposed with the granular particles 22 and fibrous media therein. Each hollow particle 24 is compressible and hollow to define a void 28 therein. Moreover, the hollow particles 24 have a size, a wall thickness, a material, and a bulk modulus defining infill properties thereof. The hollow particles 24 and the granular particles 22 are arranged to allow the cushion housing 12 to be deformed upon contact with the occupant. The hollow particles 24 and granular particles 22 define a cushion infill having a variable stiffness based on the infill properties of the hollow particles 24 and the variable internal pressure of the interior 14 of the cushion housing 12.

The system 310 further comprises the air pump 312 in communication with the controller 324 and in fluid communication with the interior 14 of the cushion housing 12. The air pump 312 is arranged to pressurize the cushion interior 14 such that the hollow particles 24, fibrous media and granular particles 22 can move past one another easily within the interior 14, thereby defining a soft stiffness state at a first pressure. To pressurize the cushion interior, it is understood that the cushion housing may have one or a plurality of inlets to which the air pump 312 may be connected.

Moreover, the cushion housing 12 is arranged to deform in the soft state in response to contact with the occupant on the exterior surface 20. That is, when the occupant rests or makes contact with the exterior surface 20, the cushion housing 12 is arranged to deform consistent with movements and weight displacements of the occupant. Additionally, when the cushion housing 12 is deformed, the interior 14 thereof may be vented through a controllable valve or pressure may be released by the vacuum pump 314 (discussed below) in fluid communication with the cushion housing 12 in response to contact with the occupant. The venting or pressure release may be done at a rate of between about 1%/s and about 25%/s.

The system 310 further comprises the vacuum pump 314 in communication with the controller 324 and in fluid communication with the cushion housing 12. The vacuum pump 314 is arranged to decrease the internal pressure of the interior 14 from the first pressure to a second pressure. Lowering or decreasing the internal pressure is accomplished such that the hollow particles 24 are interlocked with the granular particles 22 and fibrous media due to mechanical interference and friction as depicted in FIG. 8B. Such compression of the hollow particles 24 allows the cushion housing 12 to form a first conformal shape of the occupant on the exterior surface 20 to define a semi-rigid stiffness state at the second pressure (FIG. 8B). To decrease the internal pressure, it is understood that the cushion housing may have one or a plurality of outlets to which the vacuum pump 314 is connected.

In this embodiment, the air pump 312 or valve is further arranged to increase or change the pressure of the interior 14 from the second pressure to a third pressure. Here, the air pump 312 or valve changes or increases the internal pressure thereby decompressing the hollow particles 24 and lessening frictional contact and mechanical interference between the hollow particles 24, the granular particles 22 and the fibrous media. Decompression of the hollow particles 24 allows the cushion housing 12 to re-shape and conform consistent with the occupant movement defining an intermediate stiffness state at the third pressure as shown in FIG. 8D.

In this embodiment, the vacuum pump 314 is arranged to lower the internal pressure from the intermediate state (FIG. 8D) to the semi-rigid state (FIG. 8B) at the second pressure. The vacuum pump 314 is arranged to lower or decrease the internal such that the hollow particles 24 are compressed due to mechanical interference and frictional contact with each other, the granular particles 22 and the fibrous media. Compression of the hollow particles 24 allow the cushion housing 12 to form a second conformal shape consistent with the occupant. Moreover, in this embodiment, the third pressure (intermediate stiffness state) is lower than the first pressure (soft stiffness state) and the second pressure (semi-rigid stiffness state) is lower than the third pressure (intermediate stiffness state).

Referring to FIG. 10, the system 310 further comprises at least one sensor 320 in communication with the controller 324 and the cushion housing 12. The at least one sensor 320 is arranged to sense cushion housing variables and send variable signals to the controller 324. The cushion housing variable may include variables associated with the cushion housing 12 such as variable internal pressure in the interior 14, motion relative to the exterior surface 20, weight on the exterior surface 20, average displacement of the exterior surface 20, volume change of the interior 14, or any other suitable variable. The sensor 320 may be a pressure sensor, a motion sensor, a weight sensor, or any other suitable sensor without departing from the spirit or scope of the present disclosure.

In operation, the sensor 320 may sense the pressure in the interior 14 and/or occupant weight on the exterior surface 20 and send a pressure signal and/or a weight signal accordingly to the controller 324. The controller 324 receives the signals from the sensor 320 and via algorithmic modules, for example, activates/controls the air pump 312 and/or the vacuum pump 314 to decrease/increase/change the variable internal pressure of the interior 14, thereby changing the stiffness of the cushion housing 12 between the soft state, the intermediate state, and the semi-rigid state. As a result, the stiffness of the cushion member 10 can be adapted to best suit the needs of the occupant while still retaining a conformal shape.

Referring to FIG. 10, the system 310 further comprises a receiver/transmitter or transceiver 322 in communication with the controller 324. The transceiver 322 is arranged to transmit trajectory inputs to the controller 324 for changing the stiffness of the cushion 14. The trajectory inputs may be relative to at least one of vehicle speed, terrain, road conditions, road type, and selected driving mode. The transceiver 322 may be in communication with and arranged to receive data from internal and external devices, a cloud server, or any other device. Moreover, the transceiver 322 may be arranged to transmit data to the controller 324, a cloud server or any other internal unit. Such data may be associated with the trajectory inputs such as vehicle speed, acceleration, terrain, road conditions, weather forecasts, outside temperature, road type, and selected driving modes.

In operation, the transceiver 322 may receive trajectory inputs for a cloud server related to road conditions (e.g., dry, wet, slippery) and road landscape (e.g., incline, decline, tilt). The transceiver then sends a road condition signal and a landscape signal to the controller 324. The controller 324 receives the signals from the transceiver 322 and via algorithmic modules activates/controls the air pump 312 or the vacuum pump 314 to decrease, increase, or change the variable internal pressure of the interior 14, thereby changing the stiffness of the cushion housing 12 between the soft state, the intermediate state, and the semi-rigid state. As a result, the cushion member 10 is able to adapt to the road conditions and continue to provide the optimal comfort and safety for the occupant despite the changes in the road conditions and/or occupant postures.

FIG. 10 further depicts the system 310 comprising the controller 324 in communication with the air pump 312, the vacuum pump 314, the at least one sensor 320 and the transceiver 322. The controller 324 is arranged to receive cushion housing variable inputs from the sensor 320 and trajectory inputs from the transceiver 322. Moreover, the controller 324 is arranged to control the air pump 312, the vacuum pump 314, the transceiver 322, and the at least one sensor 320. The controller 324 may be an electronic control unit, a body control module, a controller 324 with algorithms or any other suitable controlling device, algorithms, modules for controlling the units of the system without departing for the spirit or scope of the present disclosure. Furthermore, the system 310 further comprises a power source 326 arranged to power the air pump 312, the vacuum pump 314, the at least one sensor 320, the transceiver 322, and the controller 324.

Additionally, it is understood that the air pump 312 and the vacuum pump 314 are arranged to change the internal pressure of the interior 14 in response to both occupant movement/weight displacement and trajectory inputs relative to at least one of vehicle speed, acceleration, terrain, road conditions, road type, and selected driving mode. As such, pressure changes between the second and third pressures may occur a multitude of times during a vehicle drive based on the trajectory inputs and occupant movements/weight displacements.

In operation for example, the sensor 320 may sense the variable internal pressure in the interior 14 and occupant weight displacement on the exterior surface 20. The sensor 320 may then send a weight signal and a pressure signal accordingly to the controller 324. Additionally, the transceiver 322 may receive (from a cloud server) trajectory inputs associated with vehicle acceleration, road type (e.g., curves, bends, straight-aways), and road conditions (e.g., wet, dry, slippery). The transceiver 322 may then send an acceleration signal, a road type signal, and a road condition signal accordingly to the controller 324. With the data from the sensor 320 and the transceiver 322, the controller 324 via algorithmic modules, for example, changes the stiffness of the cushion housing 12 by controlling the air pump 312 and the vacuum pump 314. Thus, the cushion member 10 may change between the intermediate state and the semi-rigid state as desired. As a result, the cushion member 10 is able to optimally support and protect the occupant despite the changes in road conditions etc.

In one embodiment, the first pressure (soft stiffness state) is about 0 and could rise to +5 kPa during the onset of loading, the second pressure (semi-rigid stiffness state) is between about −8 and −10 kPa but could rise to about −50 kPa, and the third pressure (intermediate stiffness state) is between about −3 kPa and about −5 kPa. For each of the first pressure, the second pressure, and the third pressure, any other suitable ranges may be used without departing from the spirit or scope of the present disclosure.

In one embodiment, the variable stiffness of the cushion infill varies between about 0.5 kilopascal (kPa) to about 3 kPa, about 10 kPa to about 15 kPa, and about 5 to about 8 kPa. Other ranges may be used to define the variable stiffness without departing from the spirit or scope of the present disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cushion member having variable stiffness for a target, the cushion member comprising:
   a cushion housing having an interior with a variable internal pressure, the cushion housing having an exterior surface for receiving the target, the cushion housing arranged to be deformable and sealable, the cushion housing comprising:
      hollow particles disposed in the interior of the cushion housing, each hollow particle being compressible and hollow to define a void therein, the hollow particles having a size, a wall thickness, a material, and an infill with specified mechanical properties, the hollow particles arranged to allow the cushion housing to be deformed upon contact with the target, the hollow particles defining a cushion infill having a variable stiffness based on the mechanical properties of the hollow particles, the mechanical properties of the cushion housing and the variable internal pressure of the interior of the cushion housing.

2. The cushion member of claim 1 wherein the variable stiffness of the cushion infill varies between about 0.5 kilopascal (kPa) to about 3 kPa, about 10 kPa to about 15 kPa, and about 5 to about 8 kPa.

3. The cushion member of claim 1 wherein the hollow particles have an outer diameter of between about 5 millimeter (mm) and about 25 mm.

4. The cushion member of claim 1 wherein each hollow particle comprises a hole formed therethrough such that the void is in fluid communication with the interior.

5. The cushion member of claim 1 wherein each hollow particle has a compressible component disposed in the void thereof to affect a bulk modulus of the hollow particle.

6. The cushion member of claim 1 wherein each hollow particle comprises an outer wall having an inner surface, the inner surface has an inner structure extending radially inward therefrom to affect a bulk modulus of the hollow particle.

7. The cushion member of claim 1 wherein the cushion member is one of a seat cushion of a vehicular seat and a member of a mechanical fixture for a mechanical loading mechanism.

8. A method of varying stiffness of a cushion member for an occupant of a vehicle, the method comprising:
   providing a cushion housing having an interior with a variable internal pressure, the cushion housing having an exterior surface for receiving the occupant, the cushion housing arranged to be deformable and sealable, the cushion housing comprising:
      hollow particles disposed in the interior of the cushion housing, each hollow particle being compressible and hollow to define a void therein, the hollow particles having a size, a wall thickness, a material, and a bulk modulus defining infill properties thereof, the hollow particles arranged to allow the cushion housing to be deformed upon contact with the occupant, the hollow particles defining a cushion infill having a variable stiffness based on the mechanical properties of the hollow particles, the mechanical properties of the cushion housing and the variable internal pressure of the interior of the cushion housing;
   pressurizing the cushion with positive pressure to the interior such that the hollow particles can easily move past one another within the interior defining a soft stiffness state at a first pressure;
   deforming the cushion housing in the soft stiffness state in response to contact with the occupant on the exterior surface;
   decreasing the internal pressure of the interior from the first pressure to a second pressure in response to continual contact with the occupant such that the hollow particles are compressed and interlocked with each other due to frictional contact and mechanical interference, allowing the cushion housing to form a first conformal shape of the occupant on the exterior surface and to define a semi-rigid stiffness state at the second pressure;
   changing the internal pressure from the second pressure to a third pressure to lessen compressive force on the hollow particles thereby allowing the hollow particles to partially decompress and reducing the mechanical interlocking and frictional resistance to relative movement between the hollow particles, which allows the cushion to attain an intermediate stiffness state while retaining a deformation conformal with the occupant at the third pressure; and
   lowering the internal pressure from the intermediate state to the semi-rigid state at the second pressure such that the hollow particles are re-compressed and the cushion re-attains the semi-rigid stiffness state at the second pressure.

9. The method of claim 8 wherein the first pressure is between about 0 up to +5 kilopascal (kPa), the second pressure is between about −8 kPa and −50 kPa, and the third pressure is between about −3 kPa and about −5 kPa.

10. The method of claim 8 wherein the variable stiffness of the cushion infill varies between about 0.5 kilopascal (kPa) to about 3 kPa, about 10 kPa to about 15 kPa, and about 5 to about 8 kPa.

11. The method of claim 8 wherein deforming the cushion housing comprises venting the cushion housing in response to contact with the occupant at a rate of between about 0.001%/s and about 20%/s.

12. The method of claim 8 wherein the exterior surface defines a upper side for receiving the occupant, the cushion housing comprising side walls extending from the first side to define the interior, wherein at least one of the side walls is arranged to deform in response to contact with the occupant.

13. The method of claim 8 wherein changing the internal pressure of the interior is in response to trajectory inputs relative to at least one of vehicle speed, vehicle terrain, road conditions, road type, and selected driving mode.

14. The method of claim 8 wherein each hollow particle comprises a through-hole formed therethrough such that the void is in fluid communication with the interior.

15. The method of claim 8 wherein each hollow particle has a compressible component disposed in the void thereof to affect the bulk modulus of the hollow particle.

16. A system for varying stiffness of a cushion member for an occupant of a vehicle, the system comprising:
   a cushion housing having an interior with a variable internal pressure, the cushion housing having an exterior surface for receiving the occupant, the cushion housing arranged to be deformable and sealable, the cushion housing comprising:
      granular particles disposed in the interior of the cushion housing; and
      hollow particles disposed with the granular particles in the interior of the cushion housing, each hollow particle being compressible and hollow to define a void therein, the hollow particles having a size, a wall thickness, a material, and a bulk modulus defining infill properties thereof, the hollow particles and the granular particles arranged to allow the cushion housing to be deformed upon contact with the occupant, the hollow particles and granular particles defining a cushion infill having a variable stiffness based on the infill properties of the hollow particles and the variable internal pressure of the interior of the cushion housing;
   an air pump in fluid communication with the cushion housing, the air pump arranged to fluidize the cushion infill with positive pressure to the interior such that the hollow particles and granular particles flow within the interior defining a soft state at a first pressure, wherein the cushion housing is arranged to deform in the soft state in response to contact with the occupant on the exterior surface;
   a vacuum pump in fluid communication with the cushion housing, the vacuum pump arranged to decrease the internal pressure of the interior from the first pressure to a second pressure in response to continual contact with the occupant such that the hollow particles are compressed due to frictional contact and interlocked with the granular particles due to mechanical interference, allowing the cushion housing to form a first conformal shape of the occupant on the exterior surface, defining a semi-rigid state at the second pressure;
   at least one sensor in communication with the cushion housing, the at least one sensor arranged to measure cushion housing variables;
   a controller in communication with the air pump, the vacuum pump, the at least one sensor, the controller arranged to receive cushion housing variable inputs from the sensor and to control the air pump, the vacuum pump and the at least one sensor; and
   a power source arranged to power the air pump, the vacuum pump, the at least on sensor, and the controller;
   wherein the air pump is arranged to increase the internal pressure from the second pressure to a third pressure in response to occupant movement relative to the exterior surface to lessen frictional contact and mechanical interference on the hollow particles such that the hollow particles decompress, allowing the cushion housing to deform consistent with the occupant movement defining an intermediate state at the third pressure, and wherein the vacuum pump is arranged to lower the internal pressure from the intermediate state to the semi-rigid state at the second pressure in response to continued contact with the occupant such that the hollow particles are compressed due to frictional contact and interlocked with the granular particles due to mechanical interference, allowing the cushion housing to form a second conformal shape consistent with the occupant movement relative to the exterior surface.

17. The system of claim 16 wherein the at least one sensor is at least one of a pressure sensor, a motion sensor, and a weight sensor.

18. The system of claim 16 wherein the first pressure is between about 0 up to +5 kPa, the second pressure is between about −8 kilopascal (kPa) and −50 kPa, and the third pressure is between about −3 kPa and about −5 kPa.

19. The system of claim 16 wherein the variable stiffness of the cushion infill varies between about 0.5 kilopascal (kPa) to about 3 kPa, about 10 kPa to about 15 kPa, and about 5 to about 8 kPa.

20. The system of claim 16 further comprising a transceiver in communication with the controller, the transceiver arranged to transmit trajectory inputs to the controller for changing the internal pressure of the interior, the trajectory inputs being relative to at least one of vehicle speed, vehicle terrain, road conditions, road type, and selected driving mode.

* * * * *